United States Patent
Ikedo et al.

(10) Patent No.: US 12,406,697 B1
(45) Date of Patent: Sep. 2, 2025

(54) VOLTAGE SLEW CONTROL OF FINE ACTUATORS DURING DISCHARGE

(71) Applicant: Western Digital Technologies Inc., San Jose, CA (US)

(72) Inventors: Gaku Ikedo, Fujisawa (JP); Hajime Eguchi, Fujisawa (JP); Hideaki Ito, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/741,406

(22) Filed: Jun. 12, 2024

(51) Int. Cl.
  *G11B 19/04* (2006.01)
  *G11B 5/55* (2006.01)
  *G11B 19/28* (2006.01)

(52) U.S. Cl.
  CPC ............ *G11B 19/041* (2013.01); *G11B 5/556* (2013.01); *G11B 19/28* (2013.01)

(58) Field of Classification Search
  None
  See application file for complete search history.

(56) References Cited

U.S. PATENT DOCUMENTS

| | | | | |
|---|---|---|---|---|
| 5,978,752 | A * | 11/1999 | Morris | G05B 21/02 360/78.07 |
| 6,229,677 | B1 * | 5/2001 | Hudson | G11B 5/4813 |
| 6,556,028 | B1 | 4/2003 | Umanskiy et al. | |
| 6,671,121 | B1 | 12/2003 | Bradbury et al. | |
| 6,747,837 | B1 | 6/2004 | Bennett | |
| 7,595,965 | B1 | 9/2009 | Kulangara et al. | |
| 8,243,397 | B2 * | 8/2012 | Messner | F03G 7/06 360/294.3 |
| 9,214,176 | B1 | 12/2015 | Sharma et al. | |
| 9,330,694 | B1 | 5/2016 | Hahn et al. | |
| 10,424,328 | B1 * | 9/2019 | Gaertner | G11B 5/4886 |
| 10,614,852 | B2 * | 4/2020 | Dunn | G06F 12/10 |
| 11,482,246 | B2 | 10/2022 | Liu et al. | |
| 2022/0262396 | A1 * | 8/2022 | Liu | G11B 5/5552 |
| 2023/0061685 | A1 | 3/2023 | Weerasooriya et al. | |

OTHER PUBLICATIONS

Sasaki et al., Active Vibration Control of a Microactuator for the Hard Disk Drive Using Self-Sensing Actuation, 2012, Smart Materials Research, vol. 2012, Hindawi Publishing Corporation, 7 pages.

* cited by examiner

*Primary Examiner* — Peter Vincent Agustin
(74) *Attorney, Agent, or Firm* — NOD Law PC

(57) ABSTRACT

A data storage device may include an outer fine actuator group, an inner fine actuator group, and control circuitry comprising: a slew control voltage generator, a first switch, and a second switch. The control circuitry is configured to: generate a control signal; control the first switch to apply the control signal to a first fine actuator group for a first duration; control the first switch to apply the control signal to a second fine actuator group for a second duration, wherein each of the first and the second fine actuator groups comprises one of the inner or the outer fine actuator groups, and wherein the first and second fine actuator group are different; concurrently discharge the first fine actuator group during the second duration, based at least in part on controlling the second switch to couple the first fine actuator group to the slew control voltage generator.

21 Claims, 10 Drawing Sheets

VOLTAGE SLEW CONTROL OF FINE ACTUATORS DURING DISCHARGE

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ (where 'i' ranges from 1 to N) comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during read/write operations. A position error signal (PES) is generated by reading the servo bursts 14, where the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some aspects, the techniques described herein relate to a data storage device including: an outer fine actuator group including a plurality of outer fine actuators; an inner fine actuator group including a plurality of inner fine actuators; and control circuitry including at least: a slew control voltage generator, a first switch, and a second switch, and wherein the control circuitry is configured to: generate a control signal; control the first switch to apply the control signal to a first fine actuator group for a first duration; control the first switch to apply the control signal to a second fine actuator group for a second duration, wherein each of the first and the second fine actuator groups includes one of the inner fine actuator group or the outer fine actuator group, and wherein the first fine actuator group is different from the second fine actuator group; concurrently discharge the first fine actuator group during the second duration, based at least in part on controlling the second switch to couple the first fine actuator group to the slew control voltage generator for the second duration.

In some aspects, the techniques described herein relate to a data storage device, wherein: the slew control voltage generator is configured to generate a slew control voltage signal; and wherein discharging the first fine actuator group during the second duration is based at least in part on applying the slew control voltage signal to the first fine actuator group.

In some aspects, the techniques described herein relate to a data storage device, wherein the control circuitry is further configured to: control the first switch to apply the control signal to the first fine actuator group for a third duration; and discharge the second fine actuator group during the third duration, based at least in part on controlling the second switch to couple the second fine actuator group to the slew control voltage generator for the third duration.

In some aspects, the techniques described herein relate to a data storage device, wherein: the first fine actuator group is associated with an enabled or active mode during the first and the third duration; the second fine actuator group is associated with the enabled or active mode during the second duration; the first fine actuator group is associated with a disabled or inactive mode during the second duration; and the second fine actuator group is associated with the disabled or inactive mode during the third duration.

In some aspects, the techniques described herein relate to a data storage device, wherein the control circuitry further includes: a system on chip (SoC); and a power large scale integrated circuit (PLSI), the PLSI including a dual-stage actuator (DSA) register for receiving an indication of the control signal from the SoC.

In some aspects, the techniques described herein relate to a data storage device, wherein the PLSI further includes: a first voltage driver configured to drive the plurality of outer fine actuators; and a second voltage driver configured to drive the plurality of inner fine actuators.

In some aspects, the techniques described herein relate to a data storage device, wherein controlling the first switch to apply the control signal further includes: coupling a respective one of the first or the second voltage driver to the DSA register for each of the first and the second duration; driving a respective one of the outer fine actuator group and the inner fine actuator group during each of the first duration and the second duration, based at least in part on coupling the respective one of the first or the second voltage driver to the DSA register; and wherein the control circuitry is further configured to: update the DSA register at or near an end of each of the first and the second durations.

In some aspects, the techniques described herein relate to a data storage device, wherein the slew control voltage generator is configured to generate one or more digital to analog converter (DAC) code values, and wherein discharging the first fine actuator group further includes: generating a "S-shaped" voltage waveform using a respective one of the first or the second voltage driver, wherein the "S-shaped" voltage waveform is generated based at least in part on the one or more DAC code values; and applying, using the respective one of the first or the second voltage driver, the "S-shaped" voltage waveform to the first fine actuator group to drive the first fine actuator group during the second duration.

In some aspects, the techniques described herein relate to a data storage device, wherein the "S-shaped" voltage waveform is associated with a piecewise quadratic function, and wherein applying the "S-shaped" voltage waveform to the first fine actuator group reduces or suppresses oscillations in the first fine actuator group during the discharging.

In some aspects, the techniques described herein relate to a data storage device, wherein the control circuitry is further configured to: enable digital slew (DS) for a first head group associated with the first fine actuator group during the first duration; and enable DS for a second head group associated with the second fine actuator group during the second duration; and wherein each of the first and the second head groups includes one of an inner head group or an outer head group, wherein the outer head group includes a plurality of outer heads, and the inner head group includes a plurality of inner heads.

In some aspects, the techniques described herein relate to a data storage device, wherein one or more of: the first duration and the second duration do not overlap, the first duration occurs before the second duration, the plurality of inner fine actuators include piezoelectric (PZT) actuators or milli-actuators, and the plurality of outer fine actuators include PZT actuators or milli-actuators.

In some aspects, the techniques described herein relate to a data storage device, further including: a plurality of disks, wherein each of the plurality of disks includes a top disk surface and a bottom disk surface; a plurality of inner actuator arms associated with the inner fine actuator group, each of the plurality of inner actuator arms including: a first inner fine actuator configured to actuate a first inner head over one of the top disk surfaces; and a second inner fine actuator configured to actuate a second inner head over one of the bottom disk surfaces; and a plurality of outer actuator arms associated with the outer fine actuator group, the plurality of outer actuator arms including: a first outer actuator arm including a first outer fine actuator configured to actuate a first outer head over a top disk surface of a top disk; and a second outer actuator arm including a second outer fine actuator configured to actuate a second outer head over a bottom disk surface of a bottom disk.

In some aspects, the techniques described herein relate to a method of operating a data storage device, including: generating a control signal; and controlling a first switch to apply the control signal to a first fine actuator group for a first duration; controlling the first switch to apply the control signal to a second fine actuator group for a second duration, wherein each of the first and the second fine actuator groups includes one of an inner fine actuator group or an outer fine actuator group, and wherein the first fine actuator group is different from the second fine actuator group; and concurrently discharging the first fine actuator group during the second duration, based at least in part on controlling a second switch to couple the first fine actuator group to a slew control voltage generator for the second duration.

In some aspects, the techniques described herein relate to a method, further including: generating, using the slew control voltage generator, a slew control voltage signal; and wherein discharging the first fine actuator group during the second duration is based at least in part on applying the slew control voltage signal to the first fine actuator group.

In some aspects, the techniques described herein relate to a method, further including: controlling the first switch to apply the control signal to the first fine actuator group for a third duration; and discharging the second fine actuator group during the third duration, based at least in part on controlling the second switch to couple the second fine actuator group to the slew control voltage generator for the third duration.

In some aspects, the techniques described herein relate to a method, wherein: the first fine actuator group is associated with an enabled or active mode during the first and the third duration; the second fine actuator group is associated with the enabled or active mode during the second duration; the first fine actuator group is associated with a disabled or inactive mode during the second duration; and the second fine actuator group is associated with the disabled or inactive mode during the third duration.

In some aspects, the techniques described herein relate to a method, wherein the slew control voltage generator is configured to generate one or more digital to analog converter (DAC) code values, and wherein discharging the first fine actuator group further includes: generating a "S-shaped" voltage waveform using a voltage driver associated with the first fine actuator group, wherein the "S-shaped" voltage waveform is generated based at least in part on the one or more DAC code values, and wherein the "S-shaped" voltage waveform is associated with a piecewise quadratic function; and applying, using the voltage driver, the "S-shaped" voltage waveform to the first fine actuator group to drive the first fine actuator group during the second duration, and wherein applying the "S-shaped" voltage waveform to the first fine actuator group reduces or suppresses oscillations in the first fine actuator group during the discharging.

In some aspects, the techniques described herein relate to a method, wherein one or more of: the first duration and the second duration do not overlap, the first duration occurs before the second duration, the plurality of inner fine actuators include PZT actuators or milli-actuators, and the plurality of outer fine actuators include PZT actuators or milli-actuators.

In some aspects, the techniques described herein relate to one or more processing devices, including: means for generating a control signal; means for controlling a first switch to apply the control signal to a first fine actuator group for a first duration; means for controlling the first switch to apply the control signal to a second fine actuator group for a second duration, wherein each of the first and the second fine actuator groups includes one of an inner fine actuator group or an outer fine actuator group, and wherein the first fine actuator group is different from the second fine actuator group; and means for concurrently discharging the first fine actuator group during the second duration, based at least in part on controlling a second switch to couple the first fine actuator group to a slew control voltage generator for the second duration.

In some aspects, the techniques described herein relate to one or more processing devices, further including: means for controlling the first switch to apply the control signal to the first fine actuator group for a third duration; and means for discharging the second fine actuator group during the third duration, based at least in part on controlling the second switch to couple the second fine actuator group to the slew control voltage generator for the third duration.

In some aspects, the techniques described herein relate to a data storage device including: an outer fine actuator group including a plurality of outer fine actuators; an inner fine actuator group including a plurality of inner fine actuators; and control circuitry comprising: a slew control voltage generator, a first switch, and a second switch, wherein the control circuitry is configured to: control the first switch to apply a control signal to a first fine actuator group for a first duration; control the first switch to apply the control signal to a second fine actuator group for a second duration, wherein each of the first and the second fine actuator groups includes one of the inner fine actuator group or the outer fine actuator group, and wherein the first fine actuator group is different from the second fine actuator group; concurrently discharge the first fine actuator group during the second duration, based at least in part on controlling the second switch to couple the first fine actuator group to the slew control voltage generator for the second duration.

In some aspects, the techniques described herein relate to a data storage device, wherein discharging the first fine actuator group comprises: applying a "S-shaped" voltage waveform to the first fine actuator group to drive the first fine actuator group during the second duration.

In some aspects, the techniques described herein relate to a data storage device, wherein, prior to applying the "S-shaped" voltage waveform, the control circuitry is configured to: generate, using the slew control voltage generator, one or more digital to analog converter (DAC) code values; and generate the "S-shaped" voltage waveform using a voltage driver, wherein the "S-shaped" voltage waveform is generated based at least in part on the one or more DAC code values.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data. For instance, the head is connected to a distal end of an actuator arm which is rotated about a pivot by the VCM in order to actuate the head radially over the disk to access radially spaced, concentric tracks. The disk drive receives power from a host computer (e.g., host 25 in FIG. 2A) for powering a spindle motor, the VCM 20, and the one or more integrated circuits that control the operation of the disk drive.

Figure 2A:
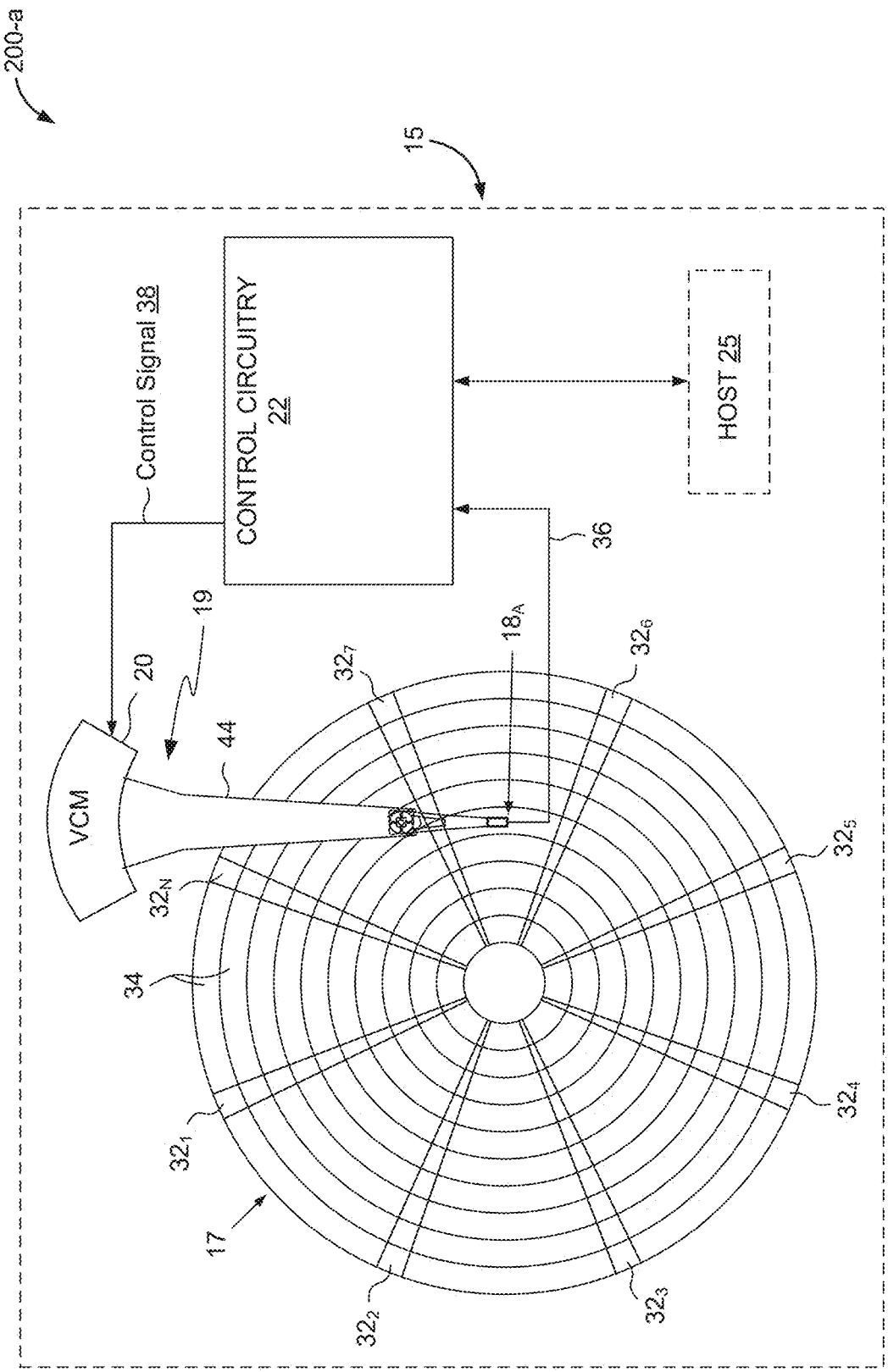
FIG. 2A illustrates a conceptual block diagram of a top view of a data storage device in the form of a disk drive comprising a head actuated over a disk and a control circuitry configured to effectuate one or more aspects of the present disclosure.
Figure 2B:
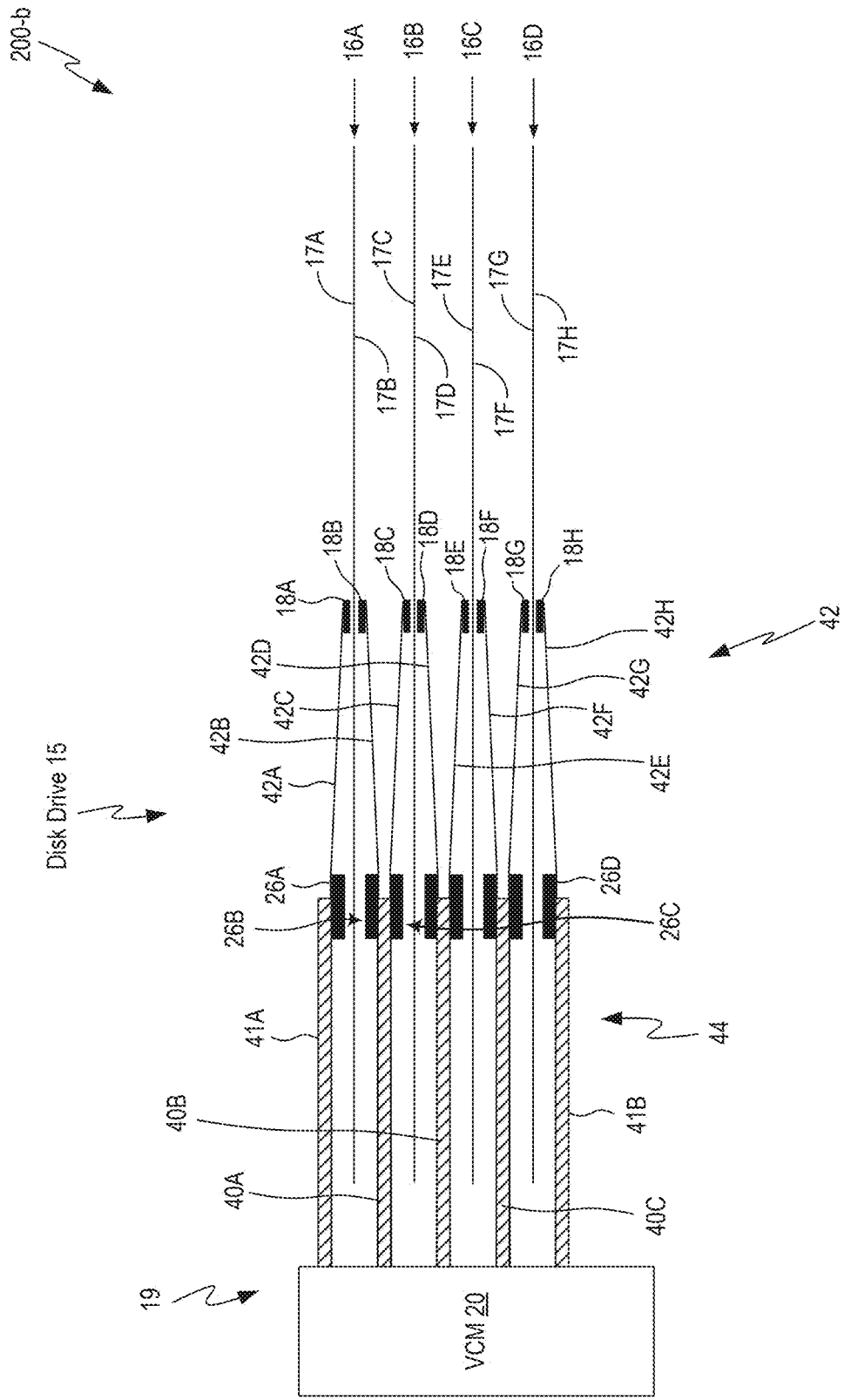
FIG. 2B illustrates a conceptual block diagram of a side view of the data storage device in FIG. 2A showing a plurality of outer and inner actuator arms each comprising outer and inner fine actuators, respectively, configured for actuating a corresponding head over a respective disk surface, according to various aspects of the present disclosure.

The disk(s) 16, such as disks 16A through 16D in FIG. 2B, are typically rotated by the spindle motor at a high speed so that an air bearing forms between the head 18 and the disk surface 17. The VCM is configured to move the head assembly across the rotating disk to access individual packets of data written on the disk's magnetic media. Typically, data is written on the surface of the disk(s) in concentric circles known as tracks. In order to read or write data at the disk surface, the magnetic read/write head(s) are positioned with high accuracy directly over the target track (i.e., track containing data requested by the computer or host's operating system).

To further increase the access speed and fine tuning the position of the read/write head over the desired tracks on high density storage media, various dual-stage actuator (DSA) systems having a primary coarse actuator (e.g., VCM) and a secondary fine actuator (e.g., PZT milli-actuator) have been developed. The VCM actuator is controlled by a servo control system that rotates the actuator arm that supports the read/write head to position the read/write head over the desired information track on the storage media. The PZT milli-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT milli-actuator makes smaller adjustments that fine tune the position of the read/write head relative to the storage media. In conjunction, the VCM actuator and the PZT milli-actuator enable information to be efficiently and accurately written to and read from high density storage media.

Figure 1:
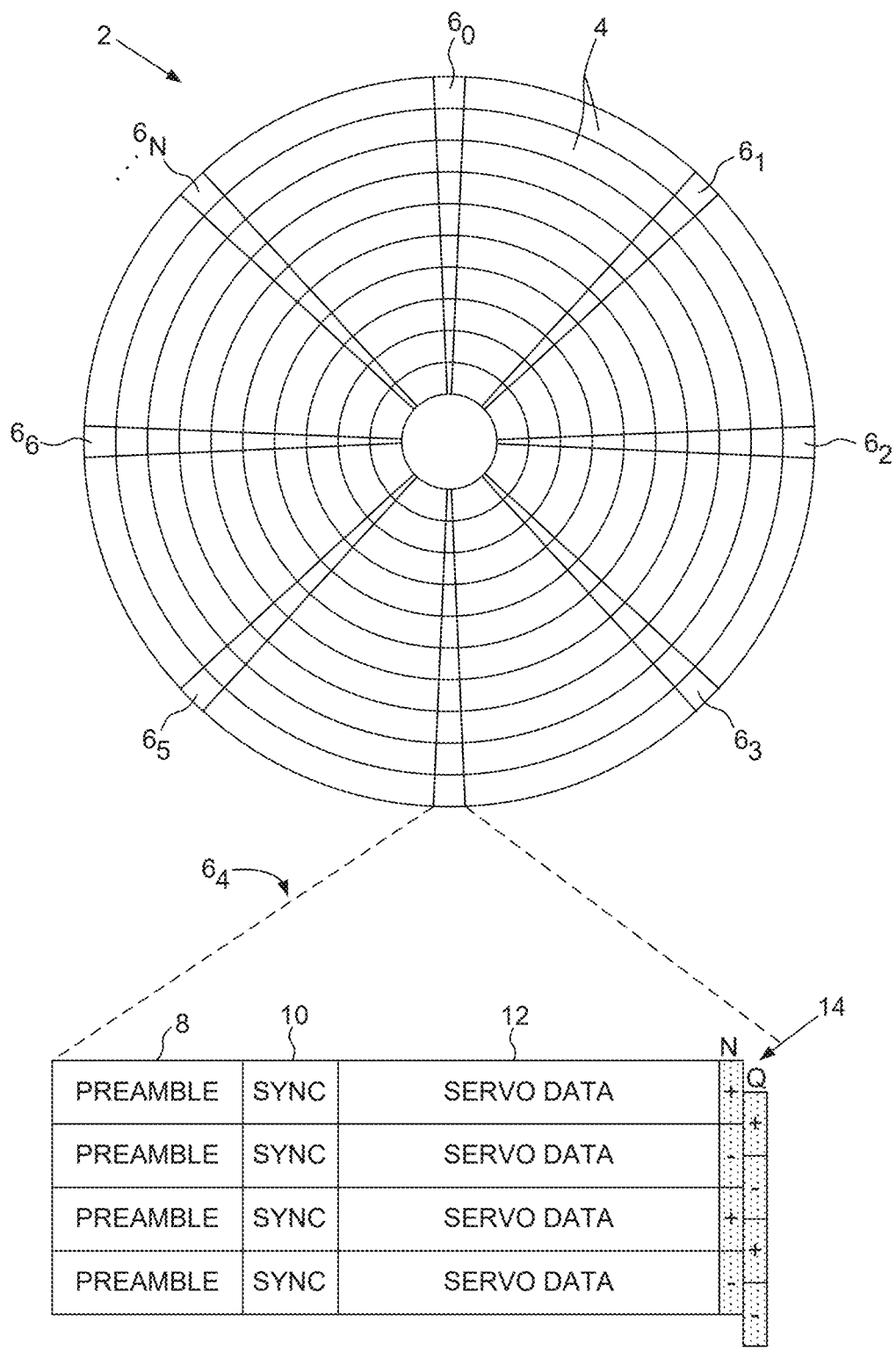
FIG. 1 shows a disk format as comprising a number of radially-spaced, concentric servo tracks defined by servo wedges recorded around the circumference of each servo track, according to various aspects of the present disclosure.
Figure 2C:
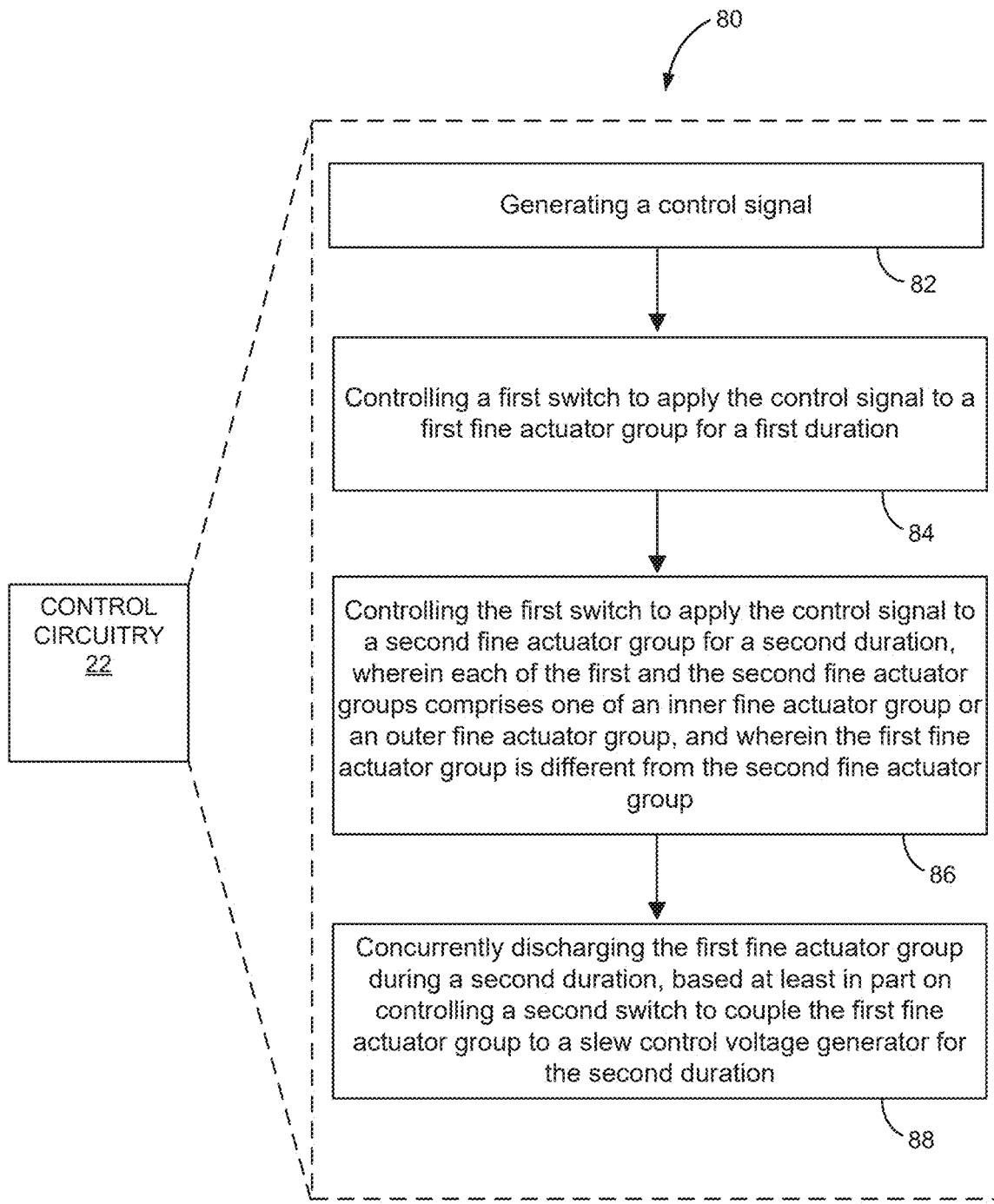
FIG. 2C illustrates an example of a method for creating a "S-shape" voltage profile for controlling a piezoelectric (PZT) of a milli actuator in a data storage device to reduce or minimize PZT oscillations, according to various aspects of the disclosure.

FIGS. 2A and 2B are conceptual top and side views 200-$a$ and 200-$b$, respectively, of a data storage device in the form of disk drive 15, in accordance with various aspects of this disclosure. Disk drive 15 implements one or more aspects of the disk drive 2 described above in relation to FIG. 1. As seen in FIGS. 2A-2C, the disk drive 15 comprises control circuitry 22, actuator assembly 19, and a plurality of disks 16 (i.e., disks 16A, 16B, 16C, 16D), each of the plurality of disks 16 comprising a top disk surface and a bottom disk surface. In some cases, the actuator assembly 19 may include the VCM 20. Beyond the VCM as a primary actuator, other secondary or tertiary actuators such as microactuators and/or milli-actuators (e.g., made with piezoelectric (PZT) elements) may be located closer to the heads 18 for more refined and precise motion control of the heads.

As seen in FIG. 2B, the disk drive 15 comprises a plurality of actuator arms 44, where the plurality of actuator arms 44 comprise a plurality of inner actuator arms 40 and a plurality of outer actuator arms 41. In some embodiments, the disk drive 15 comprises a plurality of inner actuator arms 40 (e.g., inner actuator arms 40A, 40B, 40C) each comprising a first inner fine actuator (e.g., inner fine actuator 26C) configured to actuate a top head (e.g., head 18C) over one of the top disk surfaces (e.g., top disk surface 17C of disk 16B) and a second inner fine actuator (e.g., inner fine actuator 26B) configured to actuate a bottom head (e.g., head 18B) over one of the bottom disk surfaces (e.g., bottom disk surface 17B of disk 16A). Furthermore, a first outer actuator arm 41A can include a first outer fine actuator 26A configure to actuate a top head 18A over a top disk surface 17A of a top disk 16A, and a second outer actuator arm 41B can include a second outer fine actuator 26D configured to actuate a bottom head 18H over a bottom disk surface 17H of a bottom disk 16D. In some cases, a coarse actuator (e.g., VCM 20) is configured to concurrently move the actuator arms (e.g., inner actuator arms 40A through 40C, outer actuator arms 41A and 41B) to actuate the heads (e.g., heads 18A through 18H) over their respective disk surface, wherein the inner fine actuators are controlled independent from the outer fine actuators.

Actuator assembly 19 is configured to position one or more heads 18 over disk surfaces 17 of one or more disks 16. Head(s) 18 comprise write and read elements, configured for writing and reading control features and/or data to and from a corresponding disk surface 17 (e.g., disk surfaces 17A, 17B, 17C, 17D, 17E, 17F, 17G, 17H) of disk(s) 16. As seen in FIG. 2B, actuator assembly 19 comprises primary actuator 20 (e.g., a voice coil motor ("VCM")) and a number of actuator arms (e.g., outer actuator arms 41A and 41B, and inner actuator arms 40). Each actuator arm 44 comprises a head 18 at a distal end thereof (e.g., head 18A at a distal end of outer actuator arm 41A in FIG. 2B). Each actuator arm 44 is configured to suspend a respective head 18 in close proximity over a corresponding disk surface 17 (e.g., head 18A suspended by topmost or first outer actuator arm 41A over topmost corresponding disk surface 17A, head 18H suspended by lowest or second outer actuator arm 41B over lowest corresponding disk surface 17H). In the example shown in FIG. 2B, a suspension assembly 42 (e.g., suspension assembly 42A, suspension assembly 42B, suspension assembly 42C, suspension assembly 42D, suspension assembly 42E, suspension assembly 42F, suspension assembly 42G, suspension assembly 42H) is positioned at a distal end of a respective actuator arm 44, and a head 18 (e.g., head 18A, head 18B, head 18C, head 18D, head 18E, head 18F, head 18G, head 18H) is positioned at a distal end of a respective suspension assembly 42. Various examples may include a wide variety of other numbers of hard disks and disk surfaces, other numbers of actuator arm assemblies and primary actuators, and other numbers of fine actuators on each actuator arm than those illustrated in FIGS. 2A-2B.

FIG. 2A also depicts servo sectors 32 (e.g., servo sectors $32_1$ through $32_N$) written onto disk surfaces 17 (e.g., disk surfaces 17A, 17B, 17C, 17D, 17E, 17F, 17G, 17H). Servo sectors 32 may be written to disk surfaces 17 to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align a head 18 with and relative to a particular track 34. Each track 34 includes a plurality of embedded servo sectors 32 utilized in seeking and track following. Servo sectors 32 are spaced sequentially around the circumferences of circumferential tracks 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

Control circuitry 22 may also process a signal 36 emanating from a head 18 to demodulate servo data written on the disk (e.g., servo sectors 32) to generate a position error signal (PES) representing an error between the actual position of the head and a target position relative to a target track. Control circuitry 22 may process the PES using a suitable servo control system to generate control signal 38 (e.g., a VCM control signal) applied to VCM 20 which rotates actuator arm(s) 44 about a pivot in order to actuate head 18 radially over disk surface 17 in a direction that reduces the PES. In some embodiments, disk drive 15 may also comprise a suitable micro actuator, such as a suitable piezoelectric (PZT) element for actuating head 18 relative to a suspension (e.g., suspension assembly 42 in FIG. 2B), or for actuating a suspension relative to actuator arm (e.g., inner actuator arms 40, outer actuator arms 41).

In some cases, the disk drive 15 according to various aspects of the disclosure comprises a system on a chip (SoC), where the SoC comprises the electronics and firmware for the disk drive 15. The SoC may be used to control the functions of the disk drive 15 including providing power and/or control signals to the components of the disk drive. In some cases, the SoC may include the control circuitry 22. Alternatively, one or more aspects of the control circuitry 22 may be implemented in or using the SoC.

In some examples, host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

FIG. 2C depicts a flowchart for an example method 80 that control circuitry 22 of disk drive 15 may perform or execute in controlling the operations of disk drive 15, in accordance with aspects of the present disclosure, as further described below.

As seen in FIG. 2C, the method 80 comprises generating a control signal (step 82), controlling a first switch to apply the control signal to a first fine actuator group for a first duration (step 84), controlling the first switch to apply the control signal to a second fine actuator group for a second duration (step 86), and concurrently discharging the first fine actuator group during a second duration, based at least in part on controlling a second switch to couple the first fine actuator group to a slew control voltage generator for the second duration (step 88). In some examples, each of the first and the second fine actuator groups comprises one of an inner fine actuator group or an outer fine actuator group, where the first fine actuator group is different from the second fine actuator group.

Figure 2D:
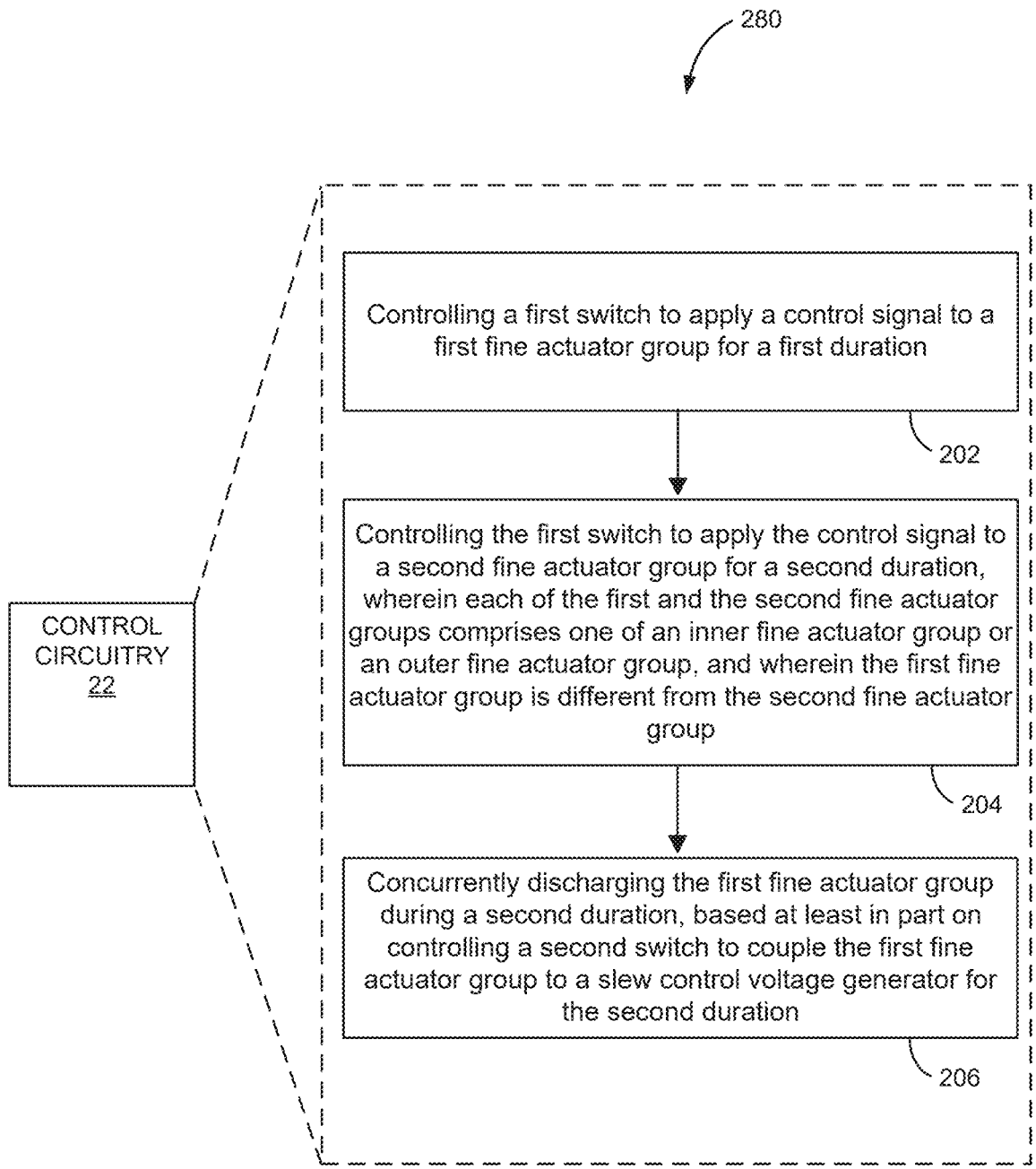
FIG. 2D illustrates another example of a method for creating a "S-shape" voltage profile for controlling a PZT of a milli actuator or fine actuator in a data storage device to reduce or minimize PZT oscillations, according to various aspects of the disclosure

FIG. 2D depicts a flowchart for an example method 280 that control circuitry 22 of disk drive 15 may perform or execute in controlling the operations of disk drive 15, in accordance with aspects of the present disclosure, as further described below.

As seen in FIG. 2D, the method 280 comprises controlling a first switch to apply a control signal to a first fine actuator group for a first duration (step 202), controlling the first switch to apply the control signal to a second fine actuator group for a second duration (step 204), and concurrently discharging the first fine actuator group during a second duration, based at least in part on controlling a second switch to couple the first fine actuator group to a slew control voltage generator for the second duration (step 206). In some examples, each of the first and the second fine actuator groups comprises one of an inner fine actuator group or an outer fine actuator group, where the first fine actuator group is different from the second fine actuator group.

In some cases, the inner fine actuators may be controlled independently from the outer fine actuators. In such cases, the control circuitry 22 (or alternatively, the SoC or PLSI) controls the inner head group for a first duration using the inner fine actuators and the outer head group for a second duration using the outer fine actuators, where the first duration and the second duration do not overlap. In some circumstances, when a fine actuator group (e.g., inner fine actuator group comprising the plurality of inner fine actuators, outer fine actuator group comprising the plurality of outer fine actuators) goes from enabled to disabled, it may result in a sudden voltage drop in the fine actuator group that is being disabled. In such cases, the fine actuators (e.g., inner fine actuators, outer fine actuators, milli actuators, PZT actuators) of the actuator group being disabled may oscillate with a steep slew rate profile, which can adversely impact disk drive performance. For example, in some cases, the SoC or control circuitry 22 may utilize a first fine actuator group (e.g., outer fine actuator group) for controlling the outer head group for a first duration, followed by a second fine actuator group (e.g., inner fine actuator group) for controlling the inner head group for a second duration. The SoC or control circuitry 22 may also control the transition (e.g., at or near the end of the first duration), where the transition includes changing the state of the outer and inner head groups (or outer and inner fine actuator groups). For instance, at the end of the first duration, the first fine actuator group goes from an enabled to a disabled state, while the second fine actuator group goes from a disabled to an enabled state. As an example, if the inner fine actuators are enabled and the outer fine actuators are disabled, the inner fine actuators may experience a sudden voltage drop during the transition when the inner fine actuators go from enabled-to-disabled. In some cases, this sudden voltage drop may cause unwanted suspension vibrations, which can adversely impact disk drive performance.

In accordance with aspects of the present disclosure, the adverse effects of such PZT suspension oscillations and/or vibrations can be reduced by controlling the slew rate of the actuator's voltage profile. In one non-limiting example, the slew rate can be controlled by using a smooth "S-shape" input voltage to intentionally drive the fine actuators (or milli-actuators) that are switching from an enabled to a disabled state. In some embodiments, one of the fine actuator groups (e.g., inner or outer fine actuator groups) can be driven using the milli dual stage actuator (mDSA) digital to analog (DAC) registers set by the system on chip (SoC), while the other of the fine actuator groups (e.g., inner or outer fine actuator groups) can be driven using the "S-shape" profile generator (or slew control module). Furthermore, at the point of transition, where one head group (e.g., inner or outer head group) is switching from an enabled to a disabled state and the other head group is switching from a disabled to an enabled state, the control circuitry 22 can control one or more switches in the power large integrated circuit (PLSI) such that the fine actuator group being disabled (i.e., previously controlled via the mDSA DAC register) may be driven using the "S-shape" profile generator instead, while the other fine actuator group being enabled may be connected to receive a control signal via the mDSA register. In this way, aspects of the present disclosure allow the inner and outer head groups (or inner and outer fine actuator groups) to be simultaneously controlled/driven using a different one of the slew control generator (or "S-shape" profile generator) and the control circuitry 22 (or SoC). As an example, if the inner head/actuator group is controlled using the control signal generated from the control circuitry 22 or SoC, the outer head/actuator group is driven by the "S-shape" profile generator. Similarly, if the inner head/actuator group is driven by the "S-shape" profile generator, the outer head/actuator group is driven by the SoC. Such a design where both the fine actuator or head groups are driven in an alternate manner using one of the SoC and the "S-shape"

profile generator can help mitigate the adverse effects of PZT suspension oscillations/vibrations when a head/actuator group switches from an enabled to a disabled state, which can enhance disk drive performance, as compared to the prior art.

Figure 3:
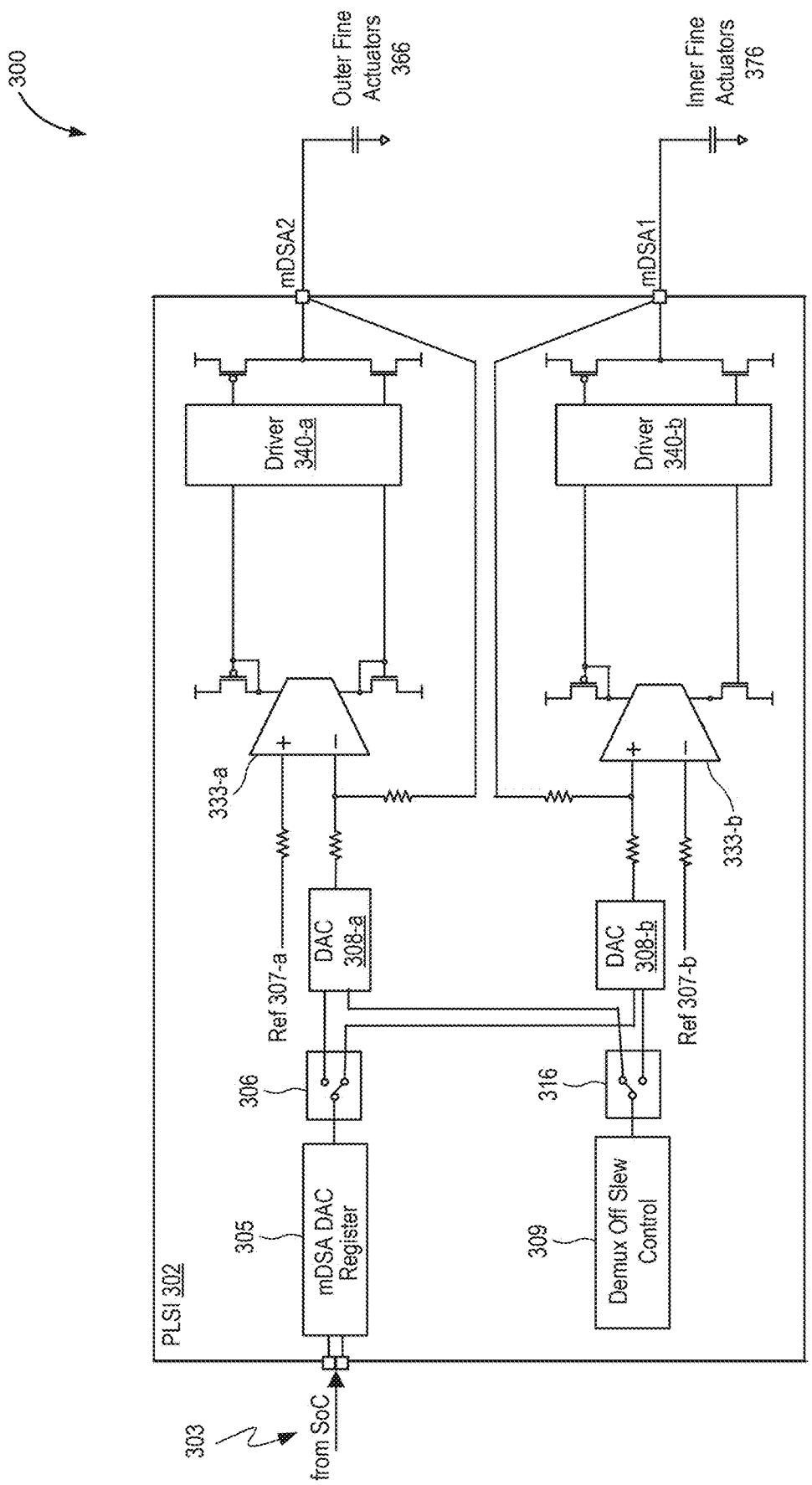
FIG. 3 shows an example of control circuitry that can be utilized for applying the control signals to the fine actuators of the inner and/or outer actuator arms of a data storage device, according to various aspects of the present disclosure.

FIG. 3 illustrates a schematic diagram of control circuitry 300, according to various aspects of the disclosure. As seen, the control circuitry 300 comprises a power large scale integrated circuit (PLSI) 302 that is configured to receive control signals 303 from the control circuitry 22 or a system on chip (SoC) of the disk drive. The PLSI 302 comprises a milli dual stage actuator digital-to-analog converter (mDSA DAC) register 305, a plurality of switches 306 and 316, a plurality of DAC modules 308-a and 308-b, a plurality of differential amplifiers 333-a and 333-b, and a plurality of fine drivers 340-a and 340-b. In this example, each of the fine drivers 340-a, 340-b is coupled to one of the outer fine actuator group or inner fine actuator group. As noted above, the outer fine actuator group may comprise the plurality of outer fine actuators and the inner fine actuator group may comprise the plurality of inner fine actuators, as previously described with reference to FIG. 2B. In some examples, the fine driver 340-a is utilized to drive the outer fine actuators 366, while the fine driver 340-b is utilized to drive the inner fine actuators 376. In some embodiments, the differential amplifiers 333-a and 333-b may also be referred to as voltage drivers 333-a and 333-b, respectively. In some cases, the PLSI 302 further includes a demux off slew control module 309 (also referred to as a slew control generator 309 and/or a S-shape profile generator 309).

In some instances, the digital control signal 303 from the SoC is stored in the register 305. This digital signal is then sent to one of the DAC 308-a or the DAC 308-b, based on the position of the switch 306. Additionally, the digital signal generated by the demux off slew control generator 309 is sent to the other of the DAC 308-b or DAC 308-b, based on the position of the switch 316. As noted above, the SoC or control circuitry 22 of the disk drive is configured to determine which one of the fine actuator/head group is driven using the SoC, and which one is driven using the S-shape generator 309. In this example, the control signal 303 can be used to toggle the switches 306 and 316 such that the inner fine actuators 376 are controlled/driven using the control signal from the control circuitry or SoC, while the outer fine actuators 366 are driven using the slew control generator 309. For example, as shown, the position or state of switch 306 enables the mDSA DAC register 305 to be coupled to the DAC 308-b. Similarly, the position or state of the switch 316 enables the slew control generator 309 to be coupled to the DAC 308-a.

In some cases, the DAC 308-b is used to convert a digital control signal (i.e., received from the SoC and stored in the mDSA DAC register 305) into an analog control signal, and the differential amplifier 333-b is used to amplify the analog control signal. In some cases, the differential amplifier 333-b also receives a reference signal 307-b, as well as feedback from the inner fine actuators 376. As such, the DAC 308-b, differential amplifier 333-b, and fine driver 340-b are associated with the inner fine actuators 376 and inner head group (not shown). Similarly, the DAC 308-a can also be used to convert a digital control signal into an analog control signal, and the differential amplifier 333-a can be used to amplify the analog control signal. In some cases, the differential amplifier 333-b also receives a reference signal 307-a, as well as feedback from the outer fine actuators 366. As such, the DAC 308-a, differential amplifier 333-a, and fine driver 340-a are associated with the outer fine actuators 366 and outer head group (not shown).

In this way, by controlling the switches 306 and 316, the control circuitry 300 enables the inner fine actuators (or inner head group) and outer fine actuators (or outer head group) to be independently driven using one of the slew control generator 309 or the SoC. In some aspects, such a design facilitates in one or more of (1) reducing or minimizing the oscillations/vibrations of the PZT suspension by preventing the steep voltage drop (or step slew rate profile) seen when a head/actuator group transitions from an enabled to a disabled state, and (2) optimizing the milli actuator transfer function, which can assist in enhancing disk drive performance as compared to the prior art.

Figure 4:
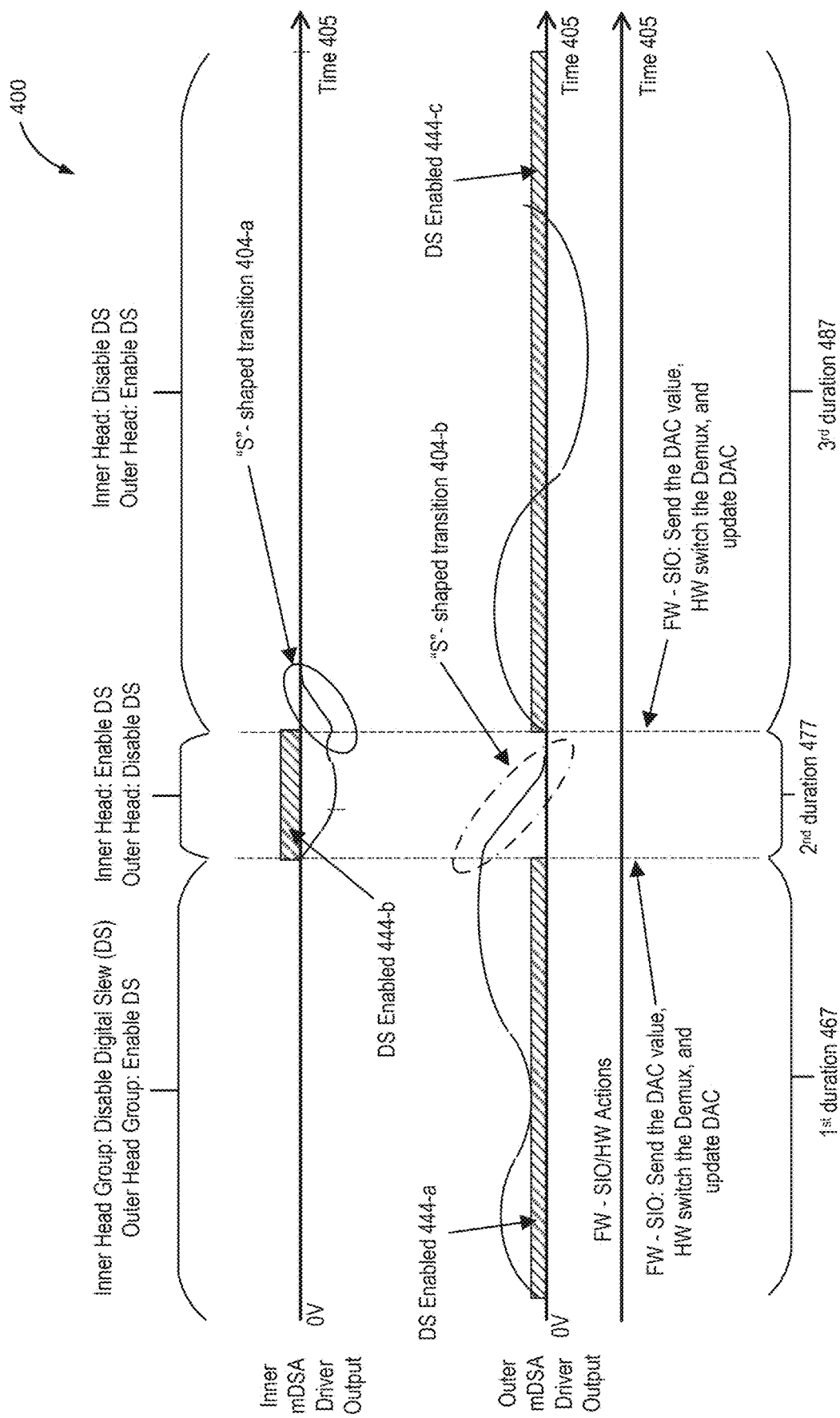
FIG. 4 illustrates a timing chart showing the inner and outer milli dual stage actuator (mDSA) driver voltage output against time, according to various aspects of the present disclosure.

FIG. 4 shows a timing diagram 400 showing inner and outer mDSA driver outputs against time, according to various aspects of the present disclosure. In this example, the voltage amplitude of the inner and outer mDSA driver outputs is shown along the vertical or y-axis, while time 405 is shown along the horizontal or x-axis. In one non-limiting example, the inner and outer mDSA driver outputs may resemble the voltage waveforms shown in FIG. 4, although other waveform shapes are also contemplated in different embodiments.

In some aspects, FIG. 4 depicts an example showing how the mDSA driver outputs provided to the inner and outer actuator/head groups vary over time when digital slew (DS) is enabled/active for one of the head groups but not the other. In some cases, the control circuitry 22 (or SoC) is configured to control the switches (e.g., switches 306 and/or 316) of the PLSI such that DS is only enabled for one of the actuator/head groups. As used herein, when a fine actuator/head group is "enabled" or "active", it means that the fine actuator/head group is controlled using a control signal generated from the SoC or control circuitry 22. Similarly, when a fine actuator/head group is "disabled" or "inactive", it means that the fine actuator/head group is connected to the slew control generator and/or intentionally driven using the slew control generator.

As seen, during the first duration 467, the control circuitry enables the outer head group (shown as enabled 444-a) and disables the inner head group. In other words, the outer head group is enabled or active and controlled using the FW-SIO or control circuitry 22. Furthermore, at the end of the first duration, the firmware (FW) serial input/output (SIO), herein referred to as FW-SIO, sends the DAC value and instructs the hardware (HW) to switch the demux, and updates the DAC. In some examples, the FW-SIO may be identical or substantially identical to the SoC and/or the control circuitry 22. Additionally, or alternatively, the FW-SIO may be implemented as part of the SoC and/or the control circuitry 22. Furthermore, the FW-SIO may be used to control the state of the switch 306 in FIG. 3, which enables the selection of the enabled or active fine actuator/head group, i.e., the fine actuator group controlled by the FW-SIO or control circuitry 22. In some cases, the DAC value in the mDSA DAC register is also updated with the DAC value received from the FW-SIO.

Furthermore, during the second duration 477, the inner head group is enabled (shown as enabled 444-b) and the outer head group is disabled. As seen, during the second duration 477, when the inner head group is enabled, the outer fine actuators (or outer head group) may be driven using the "S-shape" profile generator (e.g., shown as demux off slew control 309 in FIG. 3). In such cases, rather than a steep drop-off to '0' volts, the outer mDSA driver output voltage comprises an "S-shaped" transition 404-b that helps create a smooth profile for the output voltage waveform. As seen in FIG. 4, at the end of the second duration 477, the control circuitry 22 (or SoC) transmits a control signal to disable the inner head group and enable the outer head group (shown as enabled 444-c) during the $3^{rd}$ duration 487. In such cases, the S-shape profile generator (or demux off slew control circuit 309) is configured to drive the inner fine actuators (or inner head group) such that the inner mDSA driver output follows a smooth profile (shown by S-shaped transition 404-a) until it reaches '0' volts.

In some aspects, the smooth, measured control of the PZTs of the fine actuator/head group(s) during the discharging process (i.e., when a fine actuator/head group goes from enabled to disabled) can help minimize or reduce suspension oscillations/vibrations, which can assist in optimizing disk drive performance, as compared to the prior art.

Figure 5A:
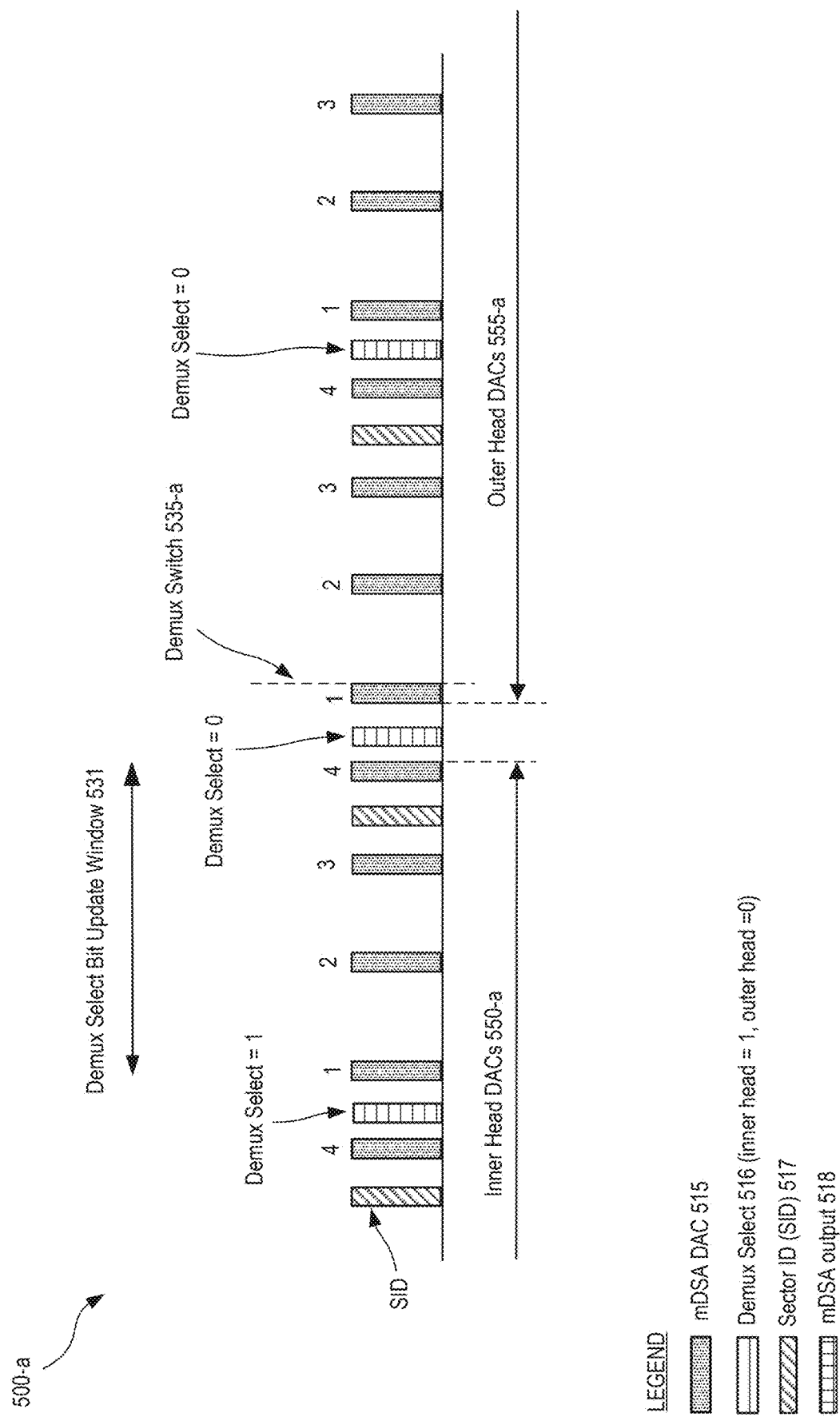
FIG. 5A illustrates a timing chart showing a demux scheme, as well as digital to analog converter (DAC) updates for the inner and outer head groups of a data storage device, according to various aspects of the present disclosure.
Figure 5B:
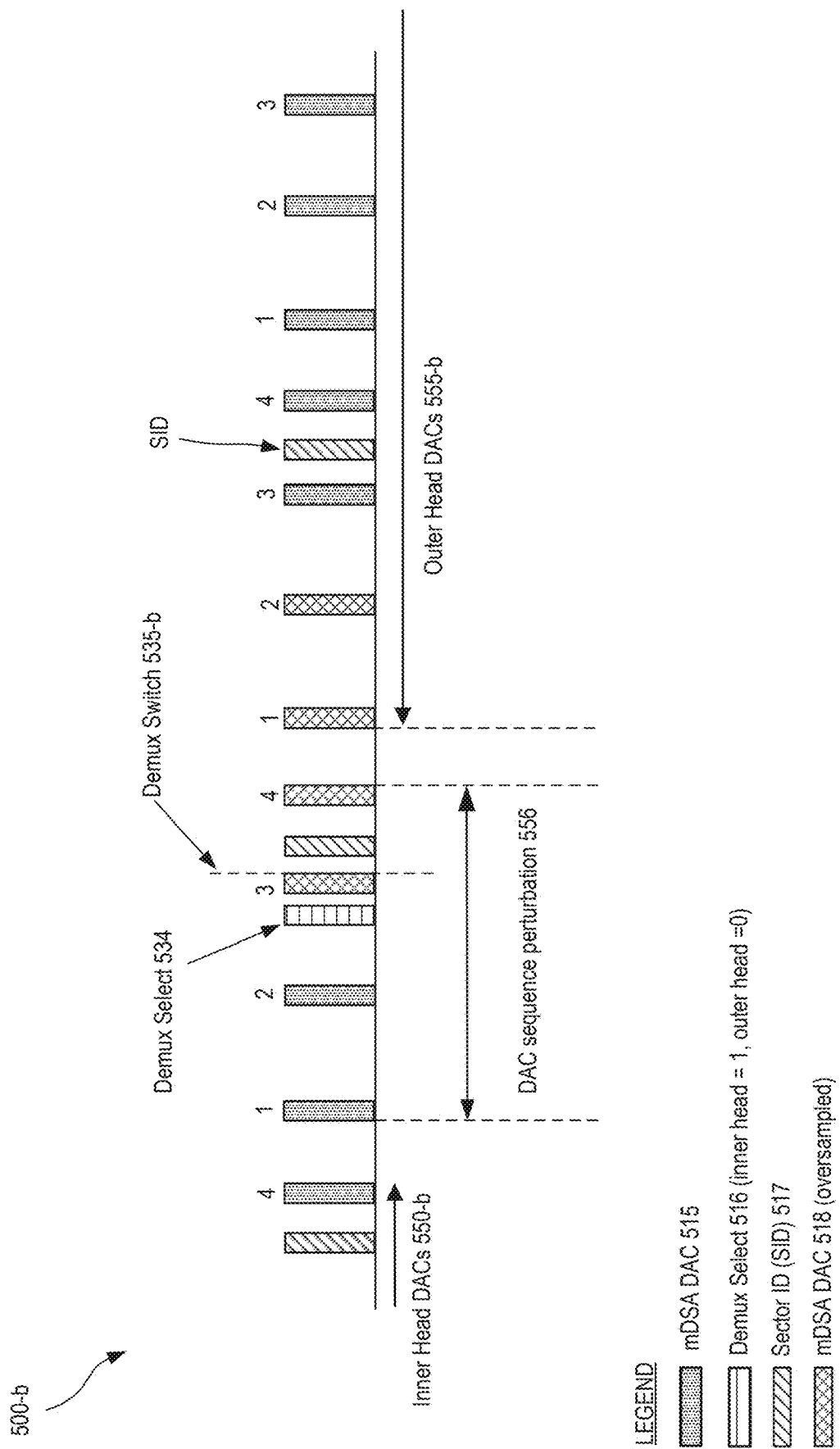
FIG. 5B illustrates another timing chart showing a demux scheme, as well as digital to analog converter (DAC) updates for the inner and outer head groups of a data storage device, according to various aspects of the present disclosure.

FIGS. 5A and 5B illustrate examples of timing diagrams 500-a and 500-b, according to various aspects of the disclosure. In some examples, the timing diagram 500-a is associated with a first scenario or method (e.g., EADC method), while the timing diagram 500-b is associated with a second scenario or method (e.g., DAC masking method).

In some cases, EADC may refer to the serial data that may be included once in each servo sector. Furthermore, the SoC may utilize the demux select 516 bit in the EADC serial data to indicate which fine actuator/head groups are driven by the mDSA DAC 515 to the PLSI. As seen in FIG. 5A, timing diagram 500-a shows an example of the various bits included in the control signal sent from the control circuitry 22 (or SoC) to the PLSI 302, where a portion of the bits are associated with the inner head group DACs 550-a and the remainder are associated with the outer head group DACs 555-a. As seen, the various types of bits included in the SoC to PLSI control signal may include one or more bits associated with each of: a mDSA DAC 515, a SID 517 (e.g., a timing signal for specifying the servo sector number), and demux select 516 (e.g., to toggle switches 306 and 316 in FIG. 3). In some embodiments, the SoC can set the value of the demux select bit 516 to indicate which head group (i.e., inner or outer head group) is driven using the SoC, and which head group is driven using the slew profile generator. In this example (going from left to right), the first set of bits are associated with the inner head group DACs 550-a, and the second set of bits are associated with the outer head group DACs 555-a. The first set of bits associated with the inner head group DACs 550-a comprises a demux select bit 516, where a value of '1' is used to indicate that the mDSA DAC bits 515 correspond to the inner head group (or inner fine actuators). In some cases, after the first set of bits are transmitted from the SoC to PLSI, the SoC transmits another demux select bit 516 with a value of '0' to indicate that the next set of bits in the control signal are associated with the outer head group (or outer fine actuators). As seen, the transmission of this second demux select bit 516 at the end of the demux select bit update window 531 results in the demux switch 535-a from the inner to the outer head group.

In some embodiments, the mDSA DAC 515 comprises the data for driving the fine actuator/head group that is enabled by the demux select bit 516. Furthermore, there may be more than 1 mDSA DAC 515 per servo sector, referred to as oversampling (OS). The oversampled mDSA DACs (labelled as '2', '3', '4' in FIG. 5A) may be based on the mDSA DAC '1'. In some cases, the demux select bit 516 may be toggled just before the first mDSA DAC 515 (labelled as '1') in every servo sector to ensure the switching occurs from the first mDSA DAC 515 in every servo sector.

In some other cases, a DAC masking method may be utilized, wherein the SoC sends just one set of data bits, including a demux select bit 534, to indicate which fine actuator/head groups are enabled, described below in reference to FIG. 5B.

As seen in FIG. 5B, timing diagram 500-b shows another example of the various bits included in the control signal sent from the control circuitry 22 (or SoC) to the PLSI 302, where a portion of the bits are associated with the inner head group DACs 550-b and the remainder are associated with the outer head group DACs 555-b. As seen, the various types of bits included in the SoC to PLSI control signal may include one or more bits associated with each of: mDSA DAC 515, SID 517 (e.g., timing signal for specifying the servo sector number), demux select 516 (e.g., to toggle switches 306 and 316 in FIG. 3), and mDSA DAC 518 (oversampled). In some embodiments, the SoC can set the value (e.g., shown as demux select 534) of the demux select bit 516 to indicate which head group (i.e., inner or outer head group) is driven using the SoC, and which head group is driven using the slew profile generator. In this example, after setting the first or leftmost demux select bit 516, one or more subsequent mDSA DAC values are ignored over the next samples. In some cases, the number of mDSA DAC values that are ignored may be based in part on the number of programmable oversamples (e.g., 4 oversamples, 8 oversamples, to name two non-limiting examples). In the example shown in FIG. 5B, the number of programmable oversamples is 4, in which case the next 4 mDSA DAC values following demux select 534 are ignored. FIG. 5B depicts different shading for the mDSA DAC 515 and the oversampled mDSA DAC 518 to better illustrate this concept. In some cases, the SoC resumes normal sampling of the mDSA DAC values upon detecting that the number of mDSA values sampled after demux select 534 equals the number of programmable over-samples (e.g., 4 oversamples).

In some cases, the DAC masking method cannot always ensure that the first mDSA DAC 515 (i.e., labeled as '1') and the switching of the fine actuator/head group (i.e., from enabled to disabled or vice-versa) are synchronized. In such cases, unintentional actuator movement by the remainder of previously-calculated oversampled mDSA DAC values can be avoided or minimized by specifying the number of mDSA DAC bits 515 that should be ignored (or treated as zero) in the newly-enabled actuator/head groups. Thus, in some aspects, ignoring the one or more mDSA DAC values following demux select 534 can help ensure that the switching of the head group is synchronized with the first mDSA DAC 515 (i.e., labeled as '1' I FIG. 5B).

Figure 6:
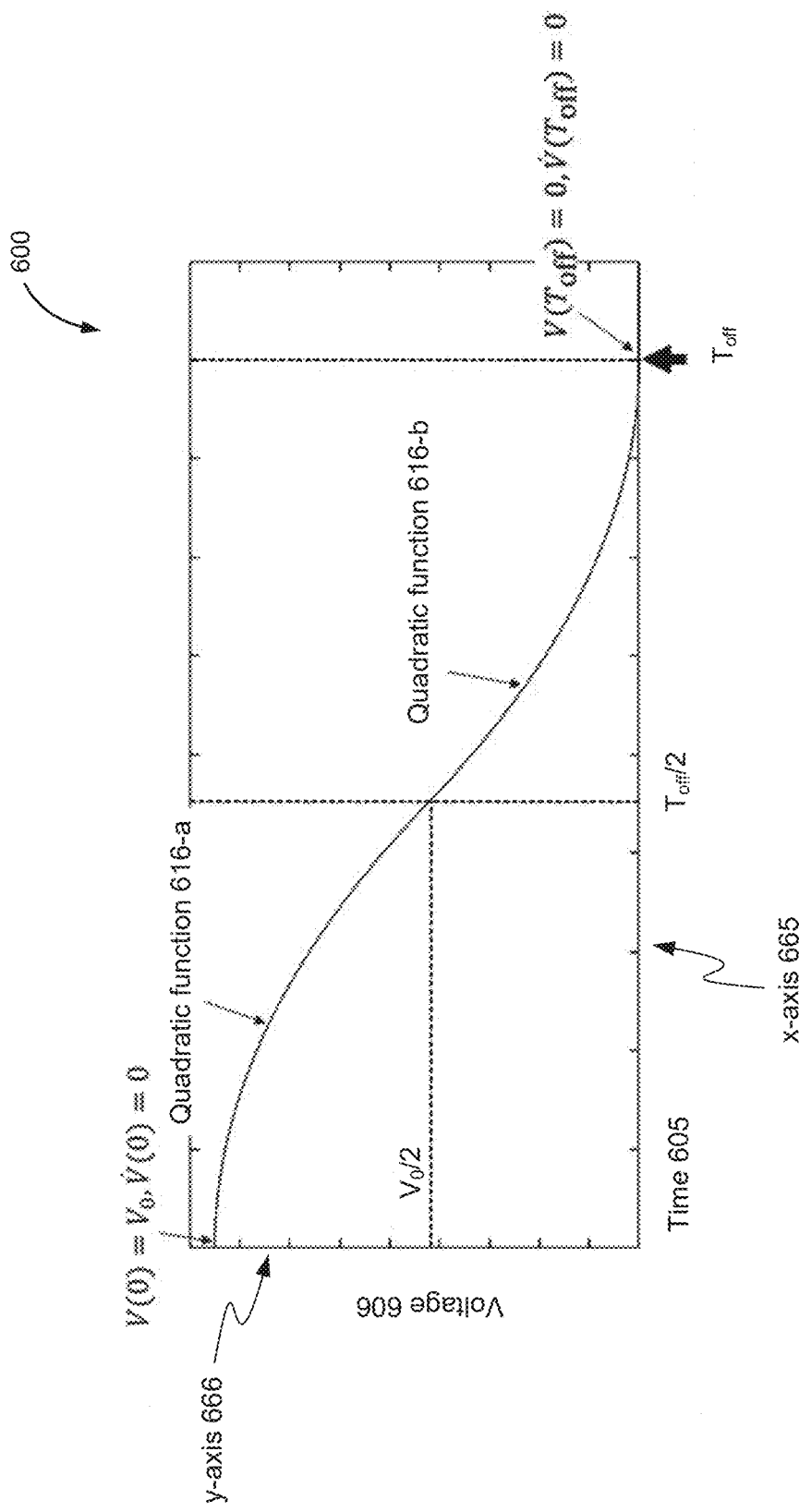
FIG. 6 shows a conceptual graph depicting a "S-shape" voltage profile, according to various aspects of the present disclosure.

FIG. 6 illustrates a conceptual graph 600 showing an example of a voltage waveform generated by a slew control generator (or S-shape profile generator), according to various aspects of the disclosure. In this example, voltage 606 is shown on the vertical or y-axis 666, while time 605 is shown on the horizontal or x-axis 605. In some cases, the slew control generator is configured to utilize a piece-wise quadratic function to generate the voltage waveform supplied to one of the inner or outer fine actuators when digital slew (DS) for the corresponding fine actuator group switches from an enabled to a disabled state. In some aspects, this voltage waveform that is generated (i.e., by the fine drivers 340-a and/or 340-b) based on the input from the slew control generator and used to intentionally drive the fine actuator/head group that is being disabled, can assist in controlling the voltage slew rate and provide a smoother transition, which in turn can facilitate in reducing oscillations/vibrations of the PZT suspension.

In one non-limiting examples, the piece-wise quadratic function may comprise a plurality of quadratic functions 616-$a$, 616-$b$ that may be applied during different sub-intervals of a particular duration (e.g., $2^{nd}$ duration 477), where the duration spans from time '0' to time '$T_{off}$'. In this example, a first quadratic function 616-$a$ is used to generate the voltage waveform for about half the total duration (e.g., between time '0' and time '$T_{off}/2$'), and a second different quadratic function 616-$b$ is used to generate the voltage waveform for the remainder of the duration (e.g., between time '$T_{off}/2$' and time '$T_{off}$'). In this case, the voltage at $T_{off}/2$ is roughly half the peak voltage ($V_0$) at time t=0. Referring back to FIG. 3, in some cases, the voltage 606 may refer to the output voltage from the driver 304-$a$ (or alternatively, the driver 304-$b$), where the voltage 606 is based on the control signal received from the slew control generator 309. In some cases, the output voltage from the driver 304-$a$ or 304-$b$ may be used to drive the PZT elements of the respective milli actuators (e.g., outer fine actuators 366, or inner fine actuators 376) from $V_0$ to 0 volts. Such a design can help smoothly discharge the potential energy stored in the PZT elements of the milli actuators.

While FIG. 6 depicts the piece-wise quadratic function as comprising two quadratic functions 616-$a$, 616-$b$, this is not intended to be limiting. In other words, the piece-wise quadratic function utilized to generate the voltage waveform supplied to the inner or outer fine actuators may include more than two quadratic functions, in some embodiments. Furthermore, it should be noted that different piece-wise quadratic functions can be utilized for the inner and outer fine actuators. In other cases, the demux off slew generator 309 may utilize the same piece-wise quadratic function for both the inner and the outer fine actuators. Other variations besides the ones listed above are contemplated in different embodiments, and the examples listed herein are not intended to limit the scope and/or spirit of the present disclosure.

It should be noted that, aspects of the present disclosure can be implemented using hardware (HW) modifications (e.g., implementing a slew control generator configured for providing digital code values corresponding to a piece-wise quadratic function to assist in discharging PZTs of a milli actuator) or using firmware (FW) modifications (e.g., programming the fine drivers of the fine actuator/head groups to generate a smooth voltage waveform and drive the respective fine actuator/head group when they switch from an enabled to a disabled state). In yet other cases, aspects of the present disclosure may be implemented through a combination of FW and HW modifications.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry 22 may include a preamp circuit, where the preamp circuit is implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., shown in FIG. 2C) described herein. The instructions may be stored in any computer-readable medium. In some examples, they may be stored on a non-volatile semiconductor memory device, component, or system external to the microprocessor, or integrated with the microprocessor in the SoC. In some examples, the instructions are stored on the disk and read into a volatile semiconductor memory when the disk drive is powered on. In some examples, the control circuitry 22 comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method(s), event(s), or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the disclosure. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for voltage slew control of milli actuators during discharge for data storage devices, and other aspects of this disclosure. Persons skilled in the relevant fields of art will be well-equipped by this disclosure with an understanding and an informed reduction to practice of a wide panoply of further applications, architectures, techniques, and methods for voltage slew control of milli actuators during discharge for data storage devices, and other aspects encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
    an outer fine actuator group including a plurality of outer fine actuators;
    an inner fine actuator group including a plurality of inner fine actuators; and
    control circuitry comprising:
        a slew control voltage generator,
        a first switch, and
        a second switch,
    wherein the control circuitry is configured to:
        control the first switch to apply a control signal to a first fine actuator group for a first duration;
        control the first switch to apply the control signal to a second fine actuator group for a second duration, wherein each of the first and the second fine actuator groups comprises one of the inner fine actuator group or the outer fine actuator group, and
    wherein the first fine actuator group is different from the second fine actuator group; and
        concurrently discharge the first fine actuator group during the second duration, based at least in part on controlling the second switch to couple the first fine actuator group to the slew control voltage generator for the second duration.

2. The data storage device of claim 1, wherein:
    the slew control voltage generator is configured to generate a slew control voltage signal; and
    discharging the first fine actuator group during the second duration is based at least in part on applying the slew control voltage signal to the first fine actuator group.

3. The data storage device of claim 2, wherein the control circuitry is further configured to:
    control the first switch to apply the control signal to the first fine actuator group for a third duration; and
    discharge the second fine actuator group during the third duration, based at least in part on controlling the second switch to couple the second fine actuator group to the slew control voltage generator for the third duration.

4. The data storage device of claim 3, wherein:
    the first fine actuator group is associated with an enabled or active mode during the first and the third durations;
    the second fine actuator group is associated with the enabled or active mode during the second duration;
    the first fine actuator group is associated with a disabled or inactive mode during the second duration; and
    the second fine actuator group is associated with the disabled or inactive mode during the third duration.

5. The data storage device of claim 1, wherein the control circuitry further comprises:
    a system on chip (SoC); and
    a power large scale integrated circuit (PLSI), the PLSI comprising a dual-stage actuator (DSA) register for receiving an indication of the control signal from the SoC.

6. The data storage device of claim 5, wherein the PLSI further comprises:
    a first voltage driver configured to drive the plurality of outer fine actuators; and a second voltage driver configured to drive the plurality of inner fine actuators.

7. The data storage device of claim 6, wherein controlling the first switch to apply the control signal further comprises:
coupling a respective one of the first or the second voltage driver to the DSA register for each of the first and the second durations; and
driving a respective one of the outer fine actuator group and the inner fine actuator group during each of the first duration and the second duration, based at least in part on coupling the respective one of the first or the second voltage driver to the DSA register; and
wherein the control circuitry is further configured to:
update the DSA register at or near an end of each of the first and the second durations.

8. The data storage device of claim 1, wherein discharging the first fine actuator group further comprises:
applying an "S-shaped" voltage waveform to the first fine actuator group to drive the first fine actuator group during the second duration.

9. The data storage device of claim 8, wherein the "S-shaped" voltage waveform is associated with a piecewise quadratic function, and wherein applying the "S-shaped" voltage waveform to the first fine actuator group reduces or suppresses oscillations in the first fine actuator group during the discharging.

10. The data storage device of claim 8, wherein, prior to applying the "S-shaped" voltage waveform, the control circuitry is configured to:
generate one or more digital to analog converter (DAC) code values; and
generate the "S-shaped" voltage waveform using a voltage driver, wherein the "S-shaped" voltage waveform is generated based at least in part on the one or more DAC code values.

11. The data storage device of claim 1, wherein the control circuitry is further configured to:
enable digital slew (DS) for a first head group associated with the first fine actuator group during the first duration; and
enable DS for a second head group associated with the second fine actuator group during the second duration; and
wherein each of the first and the second head groups comprises one of an inner head group or an outer head group, wherein the outer head group includes a plurality of outer heads, and the inner head group includes a plurality of inner heads.

12. The data storage device of claim 1, wherein one or more of:
the first duration and the second duration do not overlap,
the first duration occurs before the second duration,
the plurality of inner fine actuators comprises piezoelectric (PZT) actuators or milli-actuators, and
the plurality of outer fine actuators comprises PZT actuators or milli-actuators.

13. The data storage device of claim 1, further comprising:
a plurality of disks, wherein each of the plurality of disks comprises a top disk surface and a bottom disk surface;
a plurality of inner actuator arms associated with the inner fine actuator group, each of the plurality of inner actuator arms comprising:
a first inner fine actuator configured to actuate a first inner head over one of the top disk surfaces; and
a second inner fine actuator configured to actuate a second inner head over one of the bottom disk surfaces; and
a plurality of outer actuator arms associated with the outer fine actuator group, the plurality of outer actuator arms comprising:
a first outer actuator arm comprising a first outer fine actuator configured to actuate a first outer head over a top disk surface of a top disk; and
a second outer actuator arm comprising a second outer fine actuator configured to actuate a second outer head over a bottom disk surface of a bottom disk.

14. A method of operating a data storage device, the method comprising:
controlling a first switch to apply a control signal to a first fine actuator group for a first duration;
controlling the first switch to apply the control signal to a second fine actuator group for a second duration, wherein each of the first and the second fine actuator groups comprises one of an inner fine actuator group or an outer fine actuator group, and wherein the first fine actuator group is different from the second fine actuator group; and
concurrently discharging the first fine actuator group during the second duration, based at least in part on controlling a second switch to couple the first fine actuator group to a slew control voltage generator for the second duration.

15. The method of claim 14, further comprising:
generating, using the slew control voltage generator, a slew control voltage signal; and
wherein discharging the first fine actuator group during the second duration is based at least in part on applying the slew control voltage signal to the first fine actuator group.

16. The method of claim 15, further comprising:
controlling the first switch to apply the control signal to the first fine actuator group for a third duration; and
discharging the second fine actuator group during the third duration, based at least in part on controlling the second switch to couple the second fine actuator group to the slew control voltage generator for the third duration.

17. The method of claim 16, wherein:
the first fine actuator group is associated with an enabled or active mode during the first and the third durations;
the second fine actuator group is associated with the enabled or active mode during the second duration;
the first fine actuator group is associated with a disabled or inactive mode during the second duration; and
the second fine actuator group is associated with the disabled or inactive mode during the third duration.

18. The method of claim 14, wherein discharging the first fine actuator group further comprises:
applying, using a voltage driver, an "S-shaped" voltage waveform to the first fine actuator group to drive the first fine actuator group during the second duration, and wherein applying the "S-shaped" voltage waveform to the first fine actuator group reduces or suppresses oscillations in the first fine actuator group during the discharging.

19. The method of claim 18, wherein, prior to applying the "S-shaped" voltage waveform, the method further comprises:
generating, using the slew control voltage generator, one or more digital to analog converter (DAC) code values; and generating the "S-shaped" voltage waveform using the voltage driver, and wherein,
the voltage driver is associated with the first fine actuator group,
the "S-shaped" voltage waveform is generated based at least in part on the one or more DAC code values, and
the "S-shaped" voltage waveform is associated with a piecewise quadratic function.

20. The method of claim 14, wherein one or more of:
the first duration and the second duration do not overlap,
the first duration occurs before the second duration,
the inner fine actuator group comprises piezoelectric (PZT) actuators or milli-actuators, and
the outer fine actuator group comprises PZT actuators or milli-actuators.

21. One or more processing devices, comprising, individually or in combination:

means for generating a control signal;

means for controlling a first switch to apply the control signal to a first fine actuator group for a first duration;

means for controlling the first switch to apply the control signal to a second fine actuator group for a second duration, wherein each of the first and the second fine actuator groups comprises one of an inner fine actuator group or an outer fine actuator group, and wherein the first fine actuator group is different from the second fine actuator group; and means for concurrently discharging the first fine actuator group during the second duration, based at least in part on controlling a second switch to couple the first fine actuator group to a slew control voltage generator for the second duration.

* * * * *